United States Patent [19]
Guenther

[11] 3,756,484
[45] Sept. 4, 1973

[54] APPARATUS FOR PREPARING FIBROUS WEB

[75] Inventor: Lloyd M. Guenther, Orinda, Calif.

[73] Assignee: Chevron Research Company, San Francisco, Calif.

[22] Filed: Oct. 18, 1971

[21] Appl. No.: 190,323

Related U.S. Application Data

[60] Continuation of Ser. No. 5,394, Jan. 2, 1970, abandoned, which is a division of Ser. No. 726,438, May 3, 1968, Pat. No. 3,496,529, which is a continuation of Ser. No. 540,149, March 31, 1966, abandoned.

[52] U.S. Cl. .................................................. 225/97
[51] Int. Cl. ............................. B26f 1/20, B26f 3/02
[58] Field of Search........................... 225/3, 93, 97; 83/30, 2, 660, 678, 340, 342, 345, 672; 28/1 F; 264/154, 156, 146, DIG. 47, DIG. 8, DIG. 70

[56] References Cited
UNITED STATES PATENTS

| 782,977 | 2/1905 | Madden | 83/345 |
|---|---|---|---|
| 2,316,054 | 4/1943 | Davis et al. | 83/342 X |
| 1,726,611 | 9/1929 | Cook | 83/660 X |
| 3,273,771 | 9/1966 | Beaumont | 225/3 |

Primary Examiner—J. M. Meister
Attorney—A. L. Snow et al.

[57] ABSTRACT

Process for preparing fibrous web from uniaxially oriented polymer film in which the film is fed under slight tension between the rotating surfaces of a toothed roller having parallel, helical rows of teeth and a presser roller having helical grooves which are complementary to the teeth rows and mate with the teeth rows, rotating the toothed roller and presser roller in opposite directions substantially synchronously at peripheral speeds about 1.5 to 20 times greater than the film speed, forcing the teeth through the film and into the grooves and withdrawing the fibrillated film from between the toothed and presser rollers.

3 Claims, 5 Drawing Figures

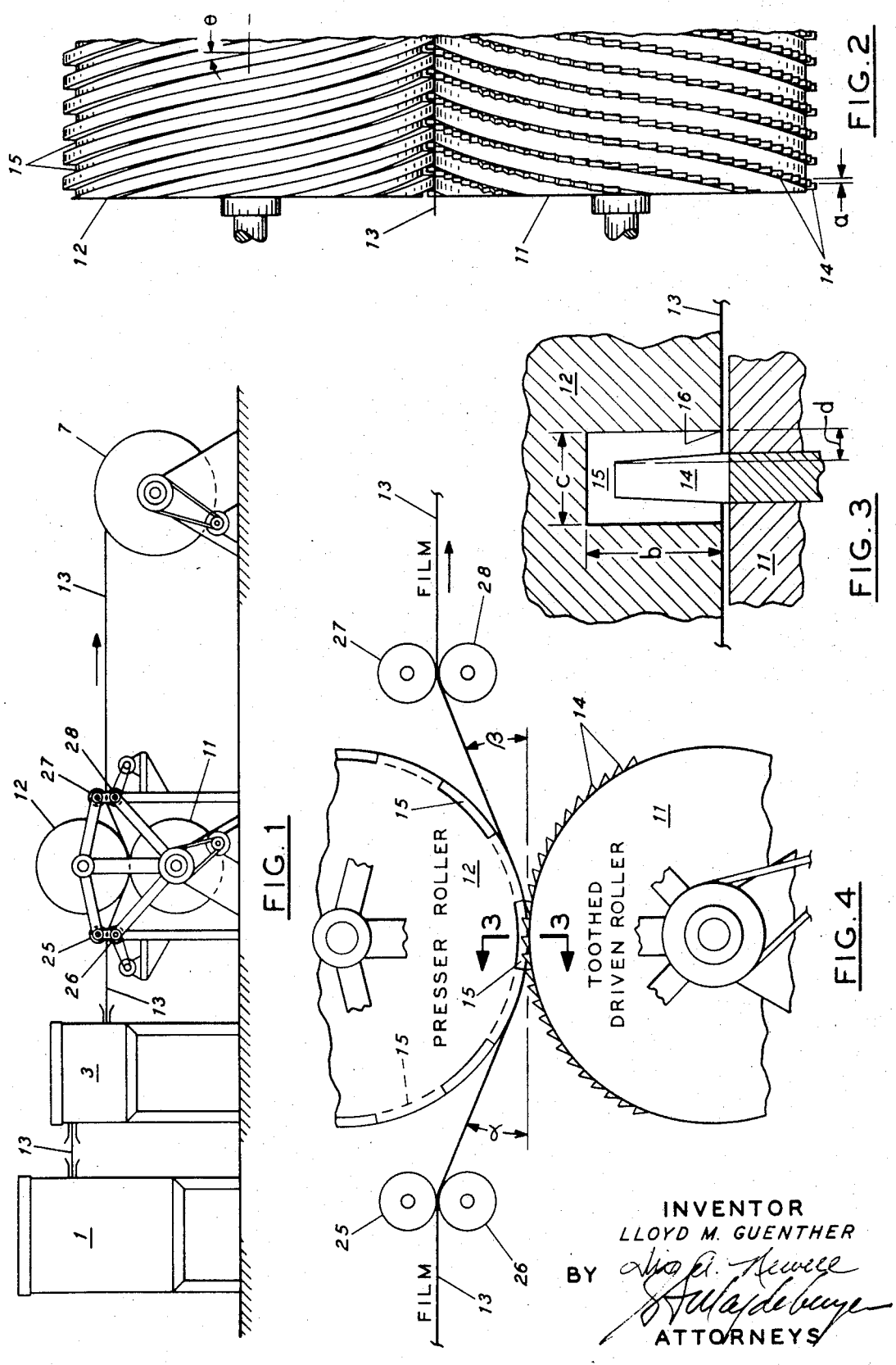

APPARATUS FOR PREPARING FIBROUS WEB

This application is a continuation of application Ser. No. 5,394, filed Jan. 2, 1970, now abandoned, which in turn is a division of application Ser. No. 726,438, filed May 3, 1968, now U.S. Pat. No. 3,496,529, issued Feb. 17, 1970, which in turn is a continuation of application Ser. No. 540,149, filed Mar. 31, 1966 and now abandoned.

FIELD OF INVENTION

This invention concerns a process for preparing highly regular fibrous webs from uniaxially oriented polymer films and the apparatus used therefor.

INVENTION BACKGROUND

Copending application Ser. No. 540,149 describes a basic method for preparing uniform fibrous webs from uniaxially oriented polymer films. In general terms this copending application describes a process wherein the film is passed between a driven roller covered with card clothing having regularly spaced points and a rotating, resilient presser or backing roller. The direction in which the film travels is substantially parallel to the rollers and perpendicular to a plane joining the longitudinal axles of the two rollers. These rollers are rotating such that the portions of their peripheries which are contacting the film are moving in the same direction as the film. The presser roller exerts sufficient pressure on the film to cause the clothing points to puncture and penetrate the film. The driven roller is run such that its peripheral speed is about 1.5 to 20 times the film speed. Thus, the clothing points act as cutting elements and cut through the film to give a uniformly fibrillated materials.

Although the above-described process has been used commercially to prepare uniform fibrous products for use in the textile industry, one important operating difficulty has been experienced. This difficulty is that the card clothing has to be replaced frequently because of wear. This, of course, causes considerable loss of operating time. Also, as the card clothing wears the fibrous web becomes less uniform. This increasing irregularity is reflected in the quality of the end textile product.

INVENTION DESCRIPTION

A novel improvement in the above-described general process has now been discovered which decreases significantly the wear on the cutting elements of the driven roller. At the same time, this unique improvement gives a fibrous web of much higher uniformity than the previously used process.

The improvement of this invention involves several important changes in the above-described process. In the improved process of this invention the film, while under controlled tension, is fed between the rotating surfaces of a driven toothed roller having parallel helical rows of sawtooth-shaped teeth and a driven presser roller having helical grooves. The rows of these teeth communicate with the presser roller grooves. The grooves are wider than the teeth widths and deeper than the teeth heights. The film is fed between the two rollers at an angle such that it contacts the presser rollers at an angle such that it contacts the presser roller surface before it contacts the toothed roller and is supported on the surface of the presser roller. The presser and toothed rollers are driven synchronously at peripheral speeds about 1.5 to about 20 times, preferably two to 15 times, greater than the film speed. The rows of teeth puncture the film and enter the grooves. Because the rollers are traveling faster than the film the teeth cut elongated slits through the film. Because the teeth and grooves are traveling substantially synchronously, the teeth remain in the groove while they are slitting the film. The position of a tooth in a groove is such that the distance between the groove edge supporting the unslit film and the nearest edge of the tip of the tooth is less than the lateral off-set distance between points of adjacent teeth in a row. The film is withdrawn from between the rollers at an angle such that it remains supported on and in contact with the presser roller surface after the teeth have finished slitting and disengage the film.

The general technology for preparing the film used in this process is well known in the art. The polymer is extruded in a conventional extruder to provide a film of desired thickness and width. For convenience, a very wide film may be extruded and then slit and trimmed to the desired width. The film may be oriented by drawing it at elevated temperatures. Draw temperatures will depend on the polymer used. The film may be heated to the desired temperature by passing it through a heating zone or over heated rolls or drums. It may be drawn in a single step or in a plurality of steps. The particular draw ratios used to orient the film will be ultimately at least about 4:1 and may extend to a ratio below that which causes the film to fibrillate spontaneously. The ultimate draw ratio in a given instance will again depend on the polymer used. For instance, draw ratios between 6:1 to 10:1, preferably 7:1 to 9:1, are desirable for normally solid, substantially crystalline polypropylene.

The film thickness should be chosen to correspond to the fineness desired in the fibrous product. The thickness of the oriented film used in the process here described is substantially uniform. Generally, the oriented film thickness will be between about 0.5 and about 3 mils, preferably 0.7 to 2 mils. Lower thicknesses within this range are used to make fine products with good hand. Thicknesses in the upper portion of this range give coarser materials.

The polymers which may be used to prepare these films are orientable, normally solid, crystalline polymers and copolymers. Typical examples of such polymers are high density polyethylene, polypropylene, poly-4-methyl-1-pentene, polyesters, polyamides, e.g., the nylons, and the like. Mixtures of such polymers may be used if desired. These polymers may also contain additives such as photostabilizers, antioxidants, heat stabilizers, dye acceptors, pigments, dyes, fillers and the like.

The driven toothed roller which is used in this invention may be made conveniently by forming grooves in the circumferential surface of a roller of desired diameter, usually about 2 to 15 in., in helical parallel rows at angles of about ½° to 45° and setting the blade portion of a sawtooth garnett wire into the grooves — leaving the garnett wire's teeth exposed and extending radially from the roller's circumferential surface. Desirably, the rows of wire around the roller are equally spaced. Similar garnett wire wrapped rollers are used in the textile art for shredding natural staple fibers.

The working angles of the teeth of the garnett wire used in this invention are desirably about 90°. If the working angle is significantly acute the fibrous web is more likely to catch on the teeth and be wrapped around the toothed roller. The lateral offset distances between the points of adjacent teeth are substantially the same and are about 1 to about 50 mils, preferably 5 to 15 mils. Since each tooth acts as a cutting element, this distance approximates the fibril width in the web. In other words, an individual fibril is formed by the cutting action of two adjacent teeth in a row which are offset from one another in a lateral direction because of the helical wrap of the wire. The teeth are usually tapered in cross section and their tips are usually flat and about 1 to about 10 mils wide. The teeth bases are normally about 15 to about 25 mils wide. Normally there are about 3 to 15 teeth per inch of wire.

In order for each tooth of the garnett wire to cut substantially equal length slits in the film, the tolerance in the distances from the toothed roller axle to the tips of the teeth should be small. Desirably, the variation in these distances should not be greater than about 2 mils.

Practically any number of teeth rows greater than 1 may be used in this invention. In any given instance the preferred number of rows will vary depending on the web pattern desired, the toothed roller's diameter and peripheral speed and the penetration. "Penetration" may be viewed as that portion of the tooth height which pierces the film. Generally the number of rows will be within the range of 4 to 30.

The circumferential surface of the presser roller as contemplated herein is helically grooved such that selected grooves mate with selected respective rows of teeth on the toothed roller. That is, the grooves have substantially the same slope as the teeth rows and the longitudinal (parallel to the roller axis) distance between adjacent grooves is substantially the same as the longitudinal distance between adjacent rows of teeth. However, the slope of the grooves is negative relative to the slope of the rows of teeth. As previously indicated, the groove width is greater than the tooth width. However, excessively wide grooves should be avoided since the film may fold into such grooves, resulting in uncut portions in the film (referred to as "skipping"). Usually the grooves are about 20 to 60 mils wide.

The grooves presser roller is subjected to substantial friction because it contacts the film and moves faster than the film. Therefore, this roller will desirably be made from hard materials such as chrome- or ceramic-coated steel. Other materials such as hard plastics, e.g., nylon or teflon, may also be used. The toothed roller may also be made of the above-described materials. The presser roller will also normally be about 2 to about 15 inches in diameter.

This invention may be further understood by referring to the drawings in which:

FIG. 1 is a schematic diagram of the film-forming and film fibrillating apparatus used in this invention;

FIG. 2 is a partial side view of the fibrillating rollers of FIG. 1;

FIG. 3 is a partial cross-sectional view of the fibrillation apparatus in FIG. 1 showing a tooth set within a presser roller groove;

FIG. 4 is a detailed partial view of the fibrillation apparatus of FIG. 1; and,

Figure 5:
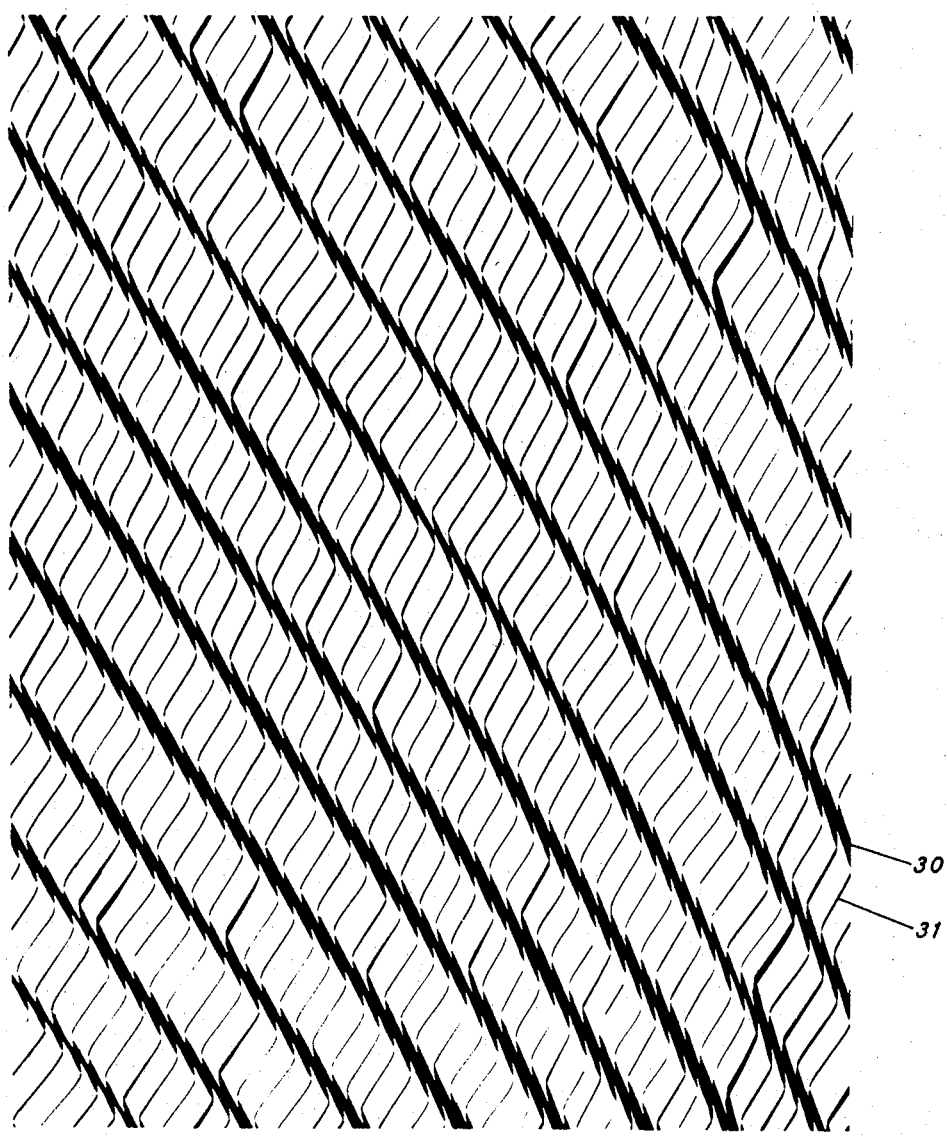
FIG. 5 is a photograph of the fibrous web prepared using the fibrillation apparatus of FIG. 1.

FIG. 1 illustrates extruding means 1 for forming film 13 and orientation means 3 for uniaxially orienting film 13, nip rolls 25 and 26, toothed roller 11, presser roller 12, a motor for driving synchronously the toothed roller and presser roller (the belt drive system coupling the toothed roller and driven roller is not shown), pull rolls 27 and 28, a motor for driving the pull rolls, take up roll 7 and a motor for driving the take up roll. The relative position of the rollers, teeth and grooves are illustrated by FIGS. 2 and 3.

FIG. 2 represents a view of toothed roller 11 and presser roller 12 taken in the opposite direction from which film 13 is traveling. Toothed roller 11 and presser roller 12 are positioned with their respective circumferential surfaces parallel and closely adjacent to and spaced apart from each other. The toothed roller 11 rotates clockwise and the presser roller 12 rotates counter-clockwise so that the surfaces of each roller in contact with film 13 travel in the same direction as film 13. As the rows of garnett wire teeth 14 puncture film 13 the teeth mesh into complementary presser roller grooves 15. The lateral offset distance between adjacent teeth in a row is $a$. The helix angle, $\theta$, of the grooves is substantially the same as the helix angle of the teeth rows but negative relative thereto.

FIG. 3 represents a partial cross section of tooth 14 within groove 15. While the groove is shown as being rectangular, it need not be of that configuration. For instance, it may trapezoidal or have a rounded bottom. The groove height is $b$. As indicated previously, the groove width, $c$, will depend on the tooth width and the desired fibril width. In general, the tooth does not have to sit symmetrically in the groove. It may be closer to the edge of the groove which supports the unslit film. In FIG. 3 this edge is represented as 16. The gap between edge 16 and the tip of the tooth is represented as $d$. It is this gap which is preferably less than the desired fibril width. Thus, as a general rule, as the desired fibril width decreases, the distance $d$ may also be decreased. As an example of the relationship between the sizes of the teeth, groove and fibril, tapered teeth 9 mils wide at the tip and having a 14 mil lateral offset distance were used with 30 mil wide presser roller grooves. The teeth sat approximately in the center of the grooves and the gap between the groove edge supporting the unslit film and the teeth was about 8 to 12 mils. With these dimensions a uniform fibrous web with 14 mil wide fibrils was made.

In the previously used process, the film was passed in a straight line between the driven roller and presser roller. However, with the new toothed driven roller and grooved presser roller if the film is passed in the same manner, i.e., tangentially, between the rollers the fibrous web had both a fuzzy appearance caused by loose broken ends and irregularities due to skipping. Unexpectedly, it was found that these difficulties could be overcome by (a) keeping the film under controlled tension and (b) maintaining it in contact with and supported on the surface of the presser roller by feeding and withdrawing it from between the rollers at certain angles. Accordingly, in this improved process, the film is fed to and withdrawn from the rollers such that the portion of the film being processed contacts the presser roller before it engages the teeth and remains against the presser roller until the teeth disengage that particular portion of the film. The fibrous web produced in this manner no longer has the fuzzy appearance of the prior art web. This feature of the process may be more readily understood by referring to FIG. 4.

FIG. 4 represents a partial side-view of the film 13 passing between toothed roller 11 and grooved presser roller 12 according to this invention. Film 13 is fed between toothed roller 11 and presser roller 12 at angle $\alpha$. As illustrated, angle $\alpha$ is the angle defined by a tangent drawn at the point where the film initially contacts grooved presser roller 12 and a chord intersecting the arcs of toothed roller 11 (measured to the teeth tips) and grooved presser roller 12. In order that the film contact presser roller 12 first, this angle in radians is greater than $$2\sqrt{pD_1/D_2(D_1+D_2)}$$

where $p$ is the depth of the greatest penetration of the teeth into the grooved presser roller, $D_1$ is the toothed roller diameter measured to the tip of the teeth and $D_2$ is the presser roller diameter. This angle will usually be about 3° to 15°. Accordingly, the film contacts the presser roller first and then is engaged by the teeth. As the teeth 14 puncture the film they move up into presser roller groove 15. They cut substantially equal length slits through the film because of the difference in the toothed roller speed and the film speed. The film remains in contact with the presser roller after the teeth disengage the portion of the film exiting from between the rollers. The fibrillated film is withdrawn from between the rollers at angle $\beta$. As illustrated, angle $\beta$ is the angle defined by a tangent drawn at the point on the presser roller where the film disengages the presser roller and the chord intersecting the arcs of the presser and toothed rollers. The minimum for angle $\beta$ is the same as that described above for angle $\alpha$. For convenience angle $\alpha$ will usually be substantially the same magnitude as angle $\beta$.

The controlled tension applied to the film while it is in contact with the presser roller is of a magnitude sufficient to keep it held tightly against the presser roller without pulling it into the presser roller grooves. Normally this tension will be about 600 to about 3,000 psi. If tensions below about 600 psi are used the fibrous web may have loose ends and irregularities caused by skipping. Tensions greater than 3,000 psi may be used but they cause increased presser roller wear and require greater power inputs. This tension may be effected by passing the film between nip rolls 25 and 26 of FIG. 4 before it enters between the toothed and presser rollers and between pull rolls 27 and 28 of FIG. 4 downstream of the rollers. The nip rolls ahead of the slitting operation "anchor" the film against the pull of the teeth. The tension may be adjusted within the above-mentioned range by increasing the speed of the pull rolls to a value about one-fourth percent to about 1 percent greater than the speed of the upstream nip rolls.

EXAMPLES

The following examples illustrate the process and apparatus of this invention. These examples are not intended to limit the invention described herein.

EXAMPLE 1

Commercial substantially crystalline polypropylene was extruded as a continuous film at a rate of about 30 feet per minute. The film was trimmed to a width of 10 inches and then oriented by stretching it over heated rollers at 250°–280°F. The ultimate draw ratio was about 7:1. In this way there was produced a film about 7½ inches wide and 1 mil thick. A thin coating of an aqueous emulsion of an antistatic agent was applied to the bottom of the film.

This oriented film was fed through a set of nip rolls and then between a toothed roller and a presser roller. The set of nip rolls was running at a peripheral speed of 200 feet per minute. Both the toothed roller and presser roller were rotating at a peripheral speed of 709 feet per minute but in opposite directions. These two rollers were coupled by a timing belt drive system and thence to a common drive shaft. The toothed roller was helically wrapped with garnett wire and the other driven presser roller was helically grooved in such a way that the garnett wire teeth meshed with and penetrated into the grooves.

The garnett wire wrapped roller was 15 inches long and 6.92 inches in diameter as measured to the tip of the teeth. This roller was covered by 16 separate, essentially parallel rows of garnett wire teeth wrapped helically in a right hand thread. Rows of teeth were equally spaced at 11 per inch. Each row contained 3.9 teeth per inch along the garnett wire. The leading edges of the teeth were perpendicular to the roller face, i.e., they had a 90° working angle. Each tooth was 0.009 inch thick at the tip.

The grooved presser roll was 15 inches long and 6.92 inches in diameter. Sixteen helical grooves 0.020 inch wide, about 0.05 inch deep and equally spaced at 11 per inch were cut into the face of the roll. The grooves were cut with a left hand thread. The surface of this roller was about 0.06 inch from the surface (at the base of the teeth) of the toothed roller which resulted in a maximum depth of penetration of a tooth into a groove of about 0.015 inch.

The oriented film contacted the grooved presser roller at an angle of 7° from tangential and it also left the grooved roll at an angle of 7°. The fibrillated film then passed through a pair of pull rollers. These pull rollers were turning at a peripheral speed of 201 feet per minute.

A sample of the fibrous web produced in accordance with the above was spread to about three times its original width, photographed, and the photograph enlarged about 2.5-fold. This photograph constitutes FIG. 5. The number of fibrils per inch of width of web averaged 55 for this web.

As illustrated by FIG. 5, the fibrous web produced by this process consists of bands or ribs 30 connected by rows of longitudinal fibrils 31 having a herringbone pattern. The ribs slope laterally across the web (film) width. The angle at which the ribs slope is in the same general direction as the slope of the teeth rows but greater in magnitude. The fibrils which connect these ribs are of uniform width and length. The interfibrillar spaces are substantially the same. The uniformity of the web may be estimated by drawing perpendicular lines across the web width at random intervals and counting the number of fibrils intersecting each line. The variation in the counts is an indication of the uniformity. In the old process, such measurements indicated relative standard deviations as great as about 20 percent. In this improved process the relative standard deviation rarely exceeds 3 percent.

EXAMPLE 2

A semiworks production of highly uniform fibrous web was made using the general process described in Example 1, but with longer toothed and presser rollers and a correspondingly wider film. Fibril counts were taken on the fibrous product at various times throughout a several weeks run. These measurements showed that the material had 71½ fibrils per inch of width with a standard deviation of 2. Each fibril was 0.035 inch long and each rib was about 0.014 inch wide.

A solid-colored product from this semiworks run was slit into narrow strips, twisted at two turns per inch and woven into a carpet. This carpet had a completely uniform appearance throughout its length and width, without any streaks due to nonuniformity. Carpets produced from fibrillated material having the same average number of fibrils per inch of width but with a relative standard deviation of about 20 percent had clearly visible streaks and were unacceptable for commercial sale.

As will be evident to those skilled in the art, various modifications on this invention can be made or followed, in the light of the foregoing disclosure and discussion, without departing from the spirit or scope of the disclosure or from the scope of the following claims.

I claim:

1. Apparatus for use in preparing fibrous web from an extruded uniaxially oriented moving polymer film by cutting elongated slits in said film comprising a toothed roller and a presser roller positioned with their respective circumferential surfaces parallel and closely adjacent to and spaced apart from each other, means for rotating the toothed roller and presser roller substantially synchronously and in relatively opposite directions to each other at peripheral speeds about 1.5 to 20 times greater than the film speed, helical grooves formed in the circumferential surface of the said presser roller, helical rows of teeth extending radially from the circumferential surface of the said toothed roller, selected rows being positioned complementary and in mating relationships to respective selected complementary helical grooves, and said teeth penetrating radially into the said respective selected grooves as the toothed roller and presser roller rotate.

2. The apparatus of claim 1 wherein the working angles of the teeth are about 90° with the roller face, the helical rows of teeth are substantially equidistant and the distances between adjacent teeth in a row are substantially the same.

3. Apparatus for use in preparing fibrous web from an extruded uniaxially oriented moving polymer film by cutting elongated slits in said film comprising a cylindrical toothed roller and a cylindrical presser roller positioned with their respective circumferential surfaces parallel and closely adjacent to and spaced apart from each other, means for feeding said film between the toothed roller and presser roller at an angle such that the film contacts the circumferential surface of the presser roller before it contacts the toothed roller and is supported on the circumferential surface of the presser roller, means for rotating the toothed roller and presser roller in relatively opposite directions to each other and substantially synchronously at peripheral speeds about 1.5 to 20 times greater than the film speed, helical grooves formed in the circumferential surface of the said presser roller, helical rows of substantially equidistant teeth extending radially from the circumferential surface of the toothed roller and having working angles of about 90° with the roller face selected rows of teeth being positioned complementary to respective selected helical grooves, said selected rows meshing with said respective selected grooves as the toothed roller and presser roller rotate such that the distance between the edges of said respective grooves which support the unslit film and the tips of said teeth meshed in said respective grooves is less than the lateral off-set distance between the points of adjacent teeth in a row, means for withdrawing the film from between said toothed roller and said presser roller at an angle such that the film remains in contact with the circumferential surface of said presser roller until the teeth disengage the film and means for keeping the film under about 600 to about 3,000 psi tension while said film contacts the circumferential surface of the presser roller.

* * * * *